J. D. OSBORN.
Wheel-Cultivator.
No. 45,264
Patented Nov. 29, 1864.
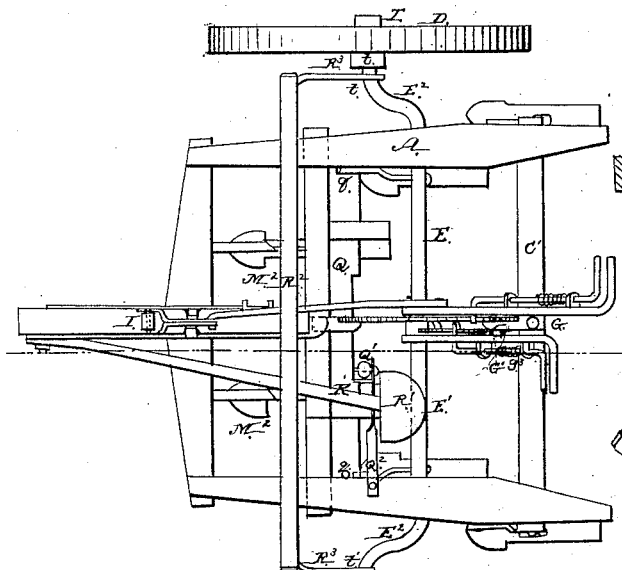
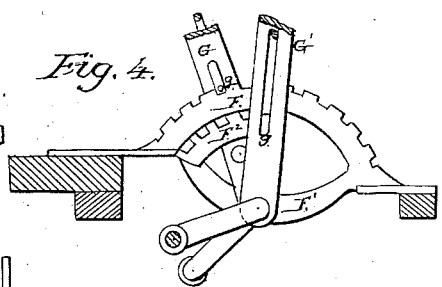
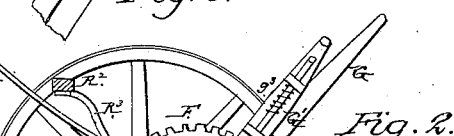
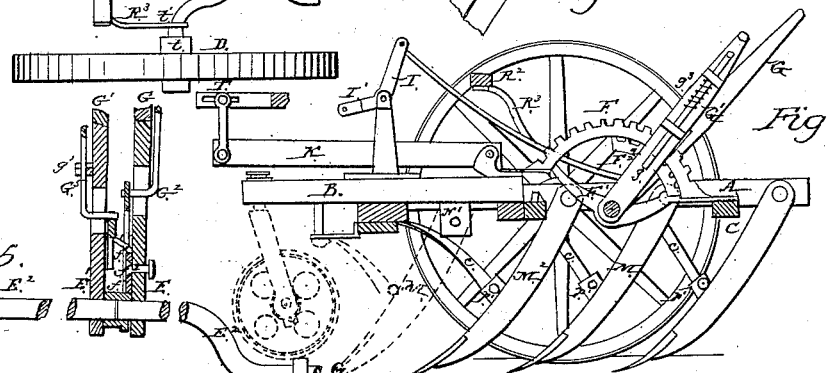
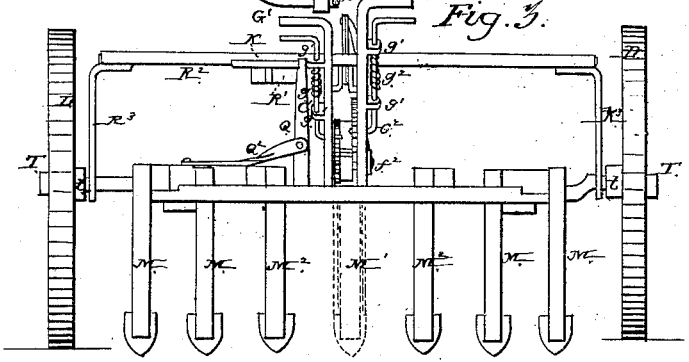
Witnesses:
Inventor:

UNITED STATES PATENT OFFICE.

JAMES D. OSBORN, OF GOSHEN, INDIANA.

IMPROVEMENT IN CULTIVATORS.

Specification forming part of Letters Patent No. 45,264, dated November 29, 1864.

*To all whom it may concern:*

Be it known that I, JAMES D. OSBORN, of Goshen, in the county of Elkhart and State of Indiana, have invented a new and Improved Cultivator; and I do hereby declare the following to be a full and exact description of the same, reference being had to the accompanying drawings, making part of this specification, in which—

Figure 1 is a plan or top view of my improved cultivator. Fig. 2 is a vertical longitudinal section of the same in the line $xx$, Fig. 1. Fig. 3 is a rear elevation of the same. Fig. 4 is a detached side view of the levers and rack, to be hereinafter described. Fig. 5 is a section of the same, exhibiting their use in connection with the axle. Fig. 6 illustrates the manner in which the brace-rods, hereinafter referred to, are attached to the plow-standards. Fig. 7 is a perspective view of my improved cultivator as adapted for the cultivation of corn.

Similar letters of reference indicate corresponding parts in the several views.

This invention consists, first, in an axle of novel construction, operating in connection with peculiarly-constructed levers and racks in such manner that the plows or shovels may be raised simultaneously and retained in an elevated position, so as to prevent injurious contact with the ground when the machine is passing over places not to be cultivated, or one of the wheels may be elevated to such height that the one on the opposite side can be run into a furrow and the plows retained in the correct horizontal position while the machine is in operation, as will be hereinafter explained; second, in the use, in connection with a hinged tongue or draft-pole, of a system of levers, by means of which the cultivator may be allowed to rest on the ground when in use, or may be elevated on its wheels to be conveyed from place to place, as hereinafter explained; and, third, in a novel manner of adapting the machine for the cultivation of corn.

In order that others skilled in the art to which my invention appertains may be enabled to fully understand and use the same, I will proceed to describe its construction and operation.

In the accompanying drawings, A A represent the side pieces of a cultivator-frame, said side pieces being placed in parallel positions and connected at their respective front and rear ends by bars C C'.

D D are the wheels, which are mounted upon an axle, E E'. This axle is formed in two equal parts, (represented respectively by the letters E and E',) which are connected together or coupled in the middle of the machine by a metallic box or socket, $f$, formed upon a metallic segment, F', which latter may constitute a brace or strengthening bar for a similarly-shaped rack, F, said rack being placed over and at right angles to the axle E E' and supported at its respective front and rear ends upon the bars B and C'. Each of the divisions E E' of the axle is offset or formed like a crank at its outer or journaled end, as shown at $E^2$, for the purpose of adapting the relative positions or heights of the respective wheels to be raised when one of the sections of the axle is turned in the manner to be explained.

G G' represent levers, the former, G, being rigidly attached to the section E of the axle, and the latter to the section E'. These levers are provided with sliding rods $G^2 G^3$, the lower ends of which are bent in the form of a knee and adapted to move in slots $g$, through which they protrude inwardly. Said rods are held in position by lugs $g\ g$.

$F^2$ is a smaller segmental rack, formed with a bracket, $f'$, which is rigidly attached to the lever G by a screw-bolt, $f^2$, in order that it may move simultaneously therewith. The lower horizontal end of the rod $G^2$ of the lever G is held between the teeth of the rack F by a spiral spring, $g^2$, and the end of the rod $G^3$ is held between the rack F' by a similar spring, $g^3$. The upper ends of the rods $G^2 G^3$ are bent in corresponding manner with the levers G G', so as to afford means for readily withdrawing their lower ends from the teeth of the racks when it is desired to turn the axle. The sections of the axle E E' are prevented from being displaced in a horizontal or lateral direction by metallic boxes, which are fastened to the under side of the beams A A and take into corresponding grooves, $E^3 E^3$, formed in the axle.

H represents a rod or pitman, the rear end of which is formed with a hook or ring, which fits loosely over the screw-bolt $f^2$, the latter projecting outwardly from the lever G for that purpose. At its front end the rod H is jointed to a crooked arm, I, the lower end of which is bifurcated for the reception of a journaled roller, I'. The arm I is pivoted near its center in a standard, J, rising from the beam B. The lever G, being turned forward so as to elevate the cultivator-frame from the ground, will cause the rod H to retract the roller I to a position between the arms of the standards J. When the roller is in this position the tongue K will be rigidly retained in contact with the beam B, and it is designed to be thus held while the machine is passing over roads or places not to be cultivated. The lever G, being retracted so as to lower the cultivator-teeth into the ground, will advance the roller and raise it out of contact with the tongue K, which tongue is pivoted at its rear end to the beam B, and which, when thus released, will allow the cultivator, when in operation, to conform to the undulations of the ground.

L represents a caster-wheel, which is swiveled upon the beam B and employed to support the front end of the machine while in operation.

M M' M$^2$ M$^2$ represent the shovel-stocks, which are arranged in two rows, converging toward the front of the machine, as clearly shown in Fig. 1, and the stocks are all attached at their upper ends by pivots, which allow the stocks to turn backward freely when their safety renders it necessary.

O may represent brace-rods, which are connected at their upper ends to various parts of the framing of the machine and at their lower ends to the shovel-stocks M M' M$^2$ M$^2$ about equidistant from the ends thereof. The shovel-stock M' is pivoted to a flanged plate, N', which is fastened by screws to the beam B, and which adapts said stock to be readily removed. The manner in which the attachment of the brace-rods to the stocks is made will be more clearly understood from Fig. 6. In this view, P represents a metallic socket, the form of which may approximate somewhat to that of a cylinder, one end being set into one of the stocks, M or M', and retained therein by a metallic pin, $p$, which passes through said stock and through holes made in opposite sides of the inserted ends of the socket, and the other end flattened for the reception and rigid retention of the brace-bar O. The brace-bar O is secured in the socket by a wooden pin, $p'$, so that when either of the shovels come in contact with an immovable body the pin $p'$ will break and permit the stock to which the shovel is attached to turn back without injury upon the pivot by which it is attached at its upper end.

Q represents a transverse bar, to which are attached two shovel-stocks, (indicated by the letters M$^2$ M$^2$.) This bar is supported at its ends in corresponding bearings formed in the beams A A, and is adapted to be slid therein by a lever, Q', for the purpose of shifting the stocks M$^2$ M$^2$ in a lateral direction when the machine is for cultivating corn. When the machine is not employed for cultivating corn the slide Q may be retained in a permanent position by pins $q$ $q$. The lever Q' is securely pivoted at its lower end to the slide Q, has its fulcrum at the end of a rigid bar, Q$^2$, and occupies a position in suitable proximity with the driver's seat R.

To obviate the necessity of supporting the weight of the driver upon the frame of the machine, and enable him with facility to elevate the same, I mount the seat R upon a bar, R', which is securely attached to a cross-piece, R$^2$, resting at its ends upon strong metallic arms R$^3$ R$^3$, which encircle the axle E E' at points outside of the cranks E$^2$ E$^2$, so that the seat R is thus not only supported independently of the frame, but adapted to remain in an immovable position during all movements of said frame. The bar R' may be attached to the tongue in any suitable manner in order to hold the seat against forward or backward movement.

T may represent the wheel-hubs, which are formed of metal and closed at their outer ends to exclude dust, &c. The inner side of the hub is formed or provided with a flange, $t$, which works over a collar that may be welded upon the axle. The said hub is prevented from endwise displacement by a disk, $t'$, which is riveted within the flange $t$.

Operation: From the above description it will be seen that while the machine is cultivating the driver is enabled to throw one of the wheels higher than the other by changing the relative positions of the levers G G', and thus permit the lower wheel to run in the furrow made by the outermost or last shovel of preceding land, and the wheel which runs in the furrow may be adjusted in height by the levers (relatively to the height of the opposite wheel) with the requisite precision to cause the plows to work in the correct horizontal position. It may be remarked that to lower the plows to their working position it is necessary to turn the lever G to a backward position. In doing this the roller I' is elevated from the tongue K, whereby the cultivator-teeth are allowed to rise and fall in conformity with the irregularity of the ground. By turning the lever G forward the plows will be raised out of contact with the ground and the tongue K pressed down and held in a rigid condition upon the beam B by the roller I', so that the machine will be supported at front by said tongue when not in operation and when being drawn over roads, &c. As the rack F$^2$ is attached to the lever G, the former moves with the latter, (unless the rod G$^3$ be detracted from the teeth of said rack in order to prevent the levers from moving simultaneously,) and consequently both sections of the axle may be turned together by turning the lever G alone. The machine may be adapted to cultivate corn by merely removing from the machine the shovel-stock M', pins $q$ $q$, and caster-wheel L. One horse of the team can then work on each side of the row, and the driver, by means of the lever Q', can readily shift the shovels upon the stocks M' M', so as to avoid uprooting any plants which may be out of line.

Having thus described my invention, the following what I claim as new and desire to secure by Letters Patent:

1. The two-part axle E E', as employed in combination with the levers G G', racks F F², and wheels D D', the whole being constructed and arranged in the manner and for the purpose specified.

2. The tongue K, in combination with the beam B, roller I', arm I, rod H, lever G, and caster-wheel L, all arranged and operating in the manner described to convert the implement from a stiff to a loose tongued machine.

3. In combination with a cultivator constructed as herein described, the slide Q, arranged and employed substantially as and for the purpose specified.

JAMES D. OSBORN.

Witnesses:
R. LOWRY,
GEO. HOWELL.